(12) United States Patent
Chen et al.

(10) Patent No.: US 10,613,992 B2
(45) Date of Patent: Apr. 7, 2020

(54) SYSTEMS AND METHODS FOR REMOTE PROCEDURE CALL

(71) Applicant: Tsinghua University, Beijing (CN)

(72) Inventors: Kang Chen, Beijing (CN); Yongwei Wu, Beijing (CN); Weimin Zheng, Beijing (CN); Maomeng Su, Beijing (CN); Teng Ma, Beijing (CN); Mingxing Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 151 days.

(21) Appl. No.: 15/919,821

(22) Filed: Mar. 13, 2018

(65) Prior Publication Data
US 2019/0286574 A1    Sep. 19, 2019

(51) Int. Cl.
*G06F 12/1081* (2016.01)
*H04L 29/08* (2006.01)
*G06F 9/54* (2006.01)

(52) U.S. Cl.
CPC .......... *G06F 12/1081* (2013.01); *G06F 9/547* (2013.01); *H04L 67/2842* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 5,829,042 A | * | 10/1998 | Leung | G06F 13/4226 711/147 |
| 6,529,503 B1 | * | 3/2003 | Chiang | H04L 49/3054 370/363 |
| 6,621,829 B1 | * | 9/2003 | Achilles | H04L 29/06 370/235 |
| 6,697,878 B1 | * | 2/2004 | Imai | G06F 9/547 709/201 |

(Continued)

OTHER PUBLICATIONS

Su, Maomeng, Zhang, Mingxing, Chen, Kang, Guo, Zhenyu, Wu, Yongwei, RFP: When RPC is Faster than Server-Bypass with RDMA, Department of Computer Science and Technology, Tsinghua National Laboratory for Information Science and Technology (TNLIST), EuroSys '17, Apr. 23-26, 2017, pp. 1-15, ISBN 978-1-4503-4938-3/17/04, ACM, Belgrade, Serbia.

*Primary Examiner* — Backhean Tiv
(74) *Attorney, Agent, or Firm* — IPro, PLLC (57) ABSTRACT

Systems and methods are provided for performing a remote procedure call. One method may comprise, at a client device, generating a request including setting a status field in a request header to indicate to a server processor that the request is ready, writing the request to a server memory via a RDMA write operation and fetching a response generated by the server processor from the server memory via a RDMA read operation. The method may further comprise, at a server device, checking a mode flag to determine that an operation mode is set to repeated remote fetching, retrieving the request from a server memory, processing the request to generate a response and writing the response to the server (Continued)

memory for the response to be fetched by a client device. The response includes a response header that comprises a status field for the status of the response and a response time.

21 Claims, 9 Drawing Sheets

(56) References Cited

U.S. PATENT DOCUMENTS

| | | | | |
|---|---|---|---|---|
| 6,728,929 | B1* | 4/2004 | Luong | H03M 13/096 370/465 |
| 8,244,969 | B2* | 8/2012 | McWilliams | G06F 12/0284 711/103 |
| 8,555,297 | B1* | 10/2013 | Gould | G06F 9/547 719/330 |
| 8,627,071 | B1* | 1/2014 | Corbett | H04L 9/3242 713/168 |
| 9,977,760 | B1* | 5/2018 | Diehl | G06F 15/17331 |
| 10,198,378 | B2* | 2/2019 | Fu | G06F 13/102 |
| 2002/0087732 | A1* | 7/2002 | Boucher | G06F 5/10 709/250 |
| 2003/0145230 | A1* | 7/2003 | Chiu | G06F 13/28 709/217 |
| 2005/0286513 | A1* | 12/2005 | King | G06F 13/387 370/389 |
| 2006/0045108 | A1* | 3/2006 | Blackmore | H04L 67/1097 370/402 |
| 2006/0179173 | A1* | 8/2006 | Bockhaus | G06F 12/1054 710/22 |
| 2006/0224834 | A1* | 10/2006 | O'Connor | G06F 12/0804 711/143 |
| 2010/0058155 | A1* | 3/2010 | Wu | H04L 1/0061 714/807 |
| 2014/0359146 | A1* | 12/2014 | Metzler | H04L 65/1069 709/228 |
| 2016/0357702 | A1* | 12/2016 | Shamis | G06F 15/167 |
| 2017/0075856 | A1* | 3/2017 | Suzue | G06F 15/17331 |
| 2018/0069923 | A1* | 3/2018 | Tsalmon | H04L 67/1097 |
| 2018/0173673 | A1* | 6/2018 | Daglis | G06F 9/52 |
| 2018/0227237 | A1* | 8/2018 | Buban | H04L 47/25 |
| 2019/0187774 | A1* | 6/2019 | Yi | G06F 13/1689 |
| 2019/0286574 | A1* | 9/2019 | Chen | H04L 67/2842 |

* cited by examiner

Fig. 2

| RESPONSE HEADER 308 |
|---|
| STATUS 310 |
| SIZE 312 |
| TIME 314 |

Fig. 3B

| REQUEST HEADER 302 |
|---|
| STATUS 304 |
| SIZE 306 |

SYSTEMS AND METHODS FOR REMOTE PROCEDURE CALL

TECHNICAL FIELD

The disclosure herein relates to distributed computing, particularly relates to implementing remote procedure calls using Remote Direct Memory Access (RDMA).

BACKGROUND

Many computing systems typically involve using a computer server to serve many clients. Today, more and more computer servers are hosted by data centers. Remote Direct Memory Access (RDMA) has been widely deployed in modern data centers. Existing usages of RDMA, however, lead to a dilemma between performance and redesign cost. They either directly replace socket-based send/receive primitives with the corresponding RDMA counterpart (server-reply), which only achieves moderate performance improvement; or push performance further by using one-sided RDMA operations to totally bypass the server (server-bypass, which does not involve the server processor), at the cost of redesigning the software. Therefore, there is a need in the art to better take advantage of the capability of RDMA.

SUMMARY

Disclosed herein is a method, comprising: generating a request including setting a status field in a request header, the status field indicating to a server processor that the request is ready; writing the request to a server memory via a Remote Direct Memory Access (RDMA) write operation; and fetching a response generated by the server processor from the server memory via a RDMA read operation.

Disclosed herein is a computing device, comprising: a Remote Direct Memory Access (RDMA) enabled network interface card (RNIC); and a processor configured to generate a request including setting a status field in a request header, the status field indicating to a server processor that the request is ready, write the request to a server memory via a RDMA write operation by the RNIC and fetch a response generated by the server processor from the server memory via a RDMA read operation by the RNIC.

Disclosed herein is one or more computer-readable non-transitory media comprising one or more instructions that when executed by a processor is to configure the processor to cause the performance of operations comprising: generating a request including setting a status field in a request header, the status field indicating to a server processor that the request is ready; writing the request to a server memory via a Remote Direct Memory Access (RDMA) write operation; and fetching a response generated by the server processor from the server memory via a RDMA read operation.

Disclosed herein is another method, comprising checking a mode flag to determine that an operation mode is set to a first value; retrieving a request from a server memory for processing; processing the request to generate a response, generating the response including setting a status field and entering a response time in a response header; and writing the response to the server memory for the response to be fetched by a client device, the status field indicating to the client device that the response is ready and the response time indicating to the client device an amount of time spent by a server processor to process the request.

Disclosed herein is a computing device, comprising: a Remote Direct Memory Access (RDMA) enabled network interface card (RNIC); and a processor configured to: check a mode flag to determine that an operation mode is set to a first value; retrieve a request from a server memory for processing, the request being received in the server memory via the RNIC; processing the request to generate a response, generating the response including setting a status field and entering a response time in a response header; and writing the response to the server memory for the response to be fetched by a client device via the RNIC, the status field indicating to the client device that the response is ready and the response time indicating to the client device an amount of time spent by the processor to process the request.

Disclosed herein is another one or more computer-readable non-transitory media comprising one or more instructions that when executed by a processor is to configure the processor to cause the performance of operations comprising: checking a mode flag to determine that an operation mode is set to a first value; retrieving a request from a server memory for processing; processing the request to generate a response, generating the response including setting a status field and entering a response time in a response header; and writing the response to the server memory for the response to be fetched by a client device, the status field indicating to the client device that the response is ready and the response time indicating to the client device an amount of time spent by the processor to process the request.

DETAILED DESCRIPTION

Specific embodiments according to the present disclosure will now be described in detail with reference to the accompanying figures. Like elements in the various figures are denoted by like reference numerals for consistency.

Figure 1:
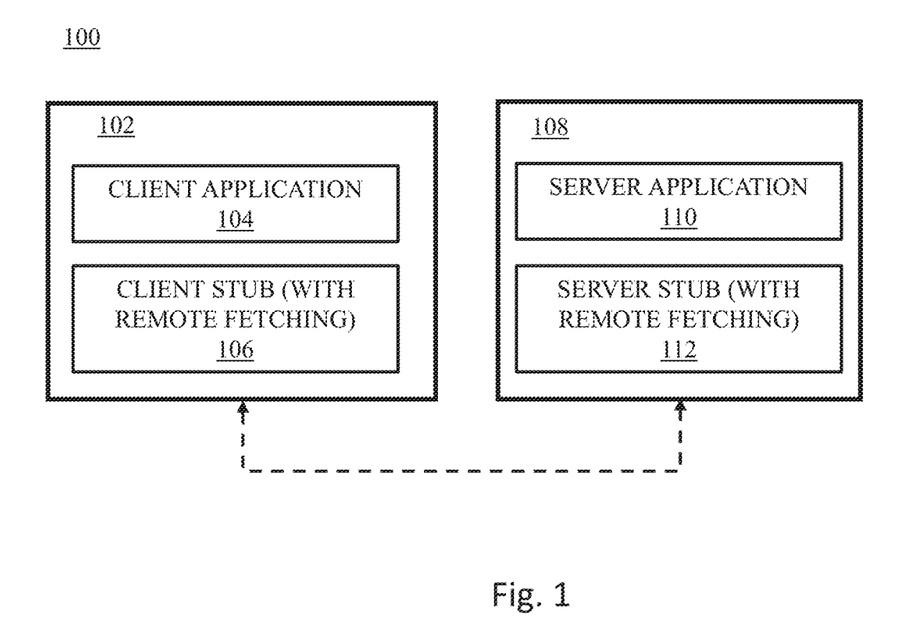
FIG. 1 schematically shows a computing system in accordance with an embodiment of the present disclosure.

The present disclosure provides systems and methods for performing remote fetching in remote procedure calls (RPCs) for distributed computing. FIG. 1 schematically shows a computing system 100 according to an embodiment. The computing system 100 may comprise a client 102 and a server 108. The client 102 may be a client device (e.g., a computing device) that may comprise a client application 104 and a client stub 106. The server 108 may a server device (e.g., a computing device) that may comprise a server application 110 and a server stub 112. The client stub 106 may be configured to perform client side remote fetching. The server stub 112 may be configured to perform server side remote fetching. Communication between the client 102 and server 108 may be handled by the client stub 106 and server stub 112. In one embodiment, for example, the client stub 106 may obtain data to be processed from the client application 104 and send the data to the server stub 112. The server application 110 may obtain the data from the server stub 112 and send a response back to the server stub 112. And the client stub 106 may fetch the response from the server stub 112 and client application 104 may obtain the response from the client stub 106.

The client stub 106 and the server stub 112 may hide the implementation detail of remote fetching from the client application 104 and server application 110. Therefore, the client application 104 and server application 110 need not be aware of the remote fetching scheme and may be programmed using any existing or yet to be developed programming paradigm or techniques. It should be noted that client 102 may be one example of many client computing devices (e.g., personal computers, laptops, tablets, smartphones, etc.) and the server 108 may be one example of many server computers in a computing system. Regardless of number of client computing devices and server computers in a computing system, the client 102 and server 108 may represent a pair of client-server in distributed computing.

In some embodiments, the remote fetching technique may provide six application programming interface (APIs) as summarized in Table 1 below. Two APIs may be used by a client (e.g., client 102) to send data to be processed to a server (e.g., server 108) and fetch a response from the server. One API, for example, client_send, may be used by the client 102 to send data to the server 108 for processing. In one embodiment, client_send may take three parameters: a first parameter identifying a server to receive the data to be processed (e.g., an identifier for the server 108), a second parameter identifying the location of the data to be processed (e.g., a pointer to a memory location in the client's memory) and a third parameter indicating the size of the data to be processed). client_send may be implemented by a RDMA write operation, which may be provided by an existing or yet to be developed RDMA enabled Network Interface Card (RNIC). Data to be processed may be transmitted in a message to the server. Another API, for example, client_recv, may be used by the client 102 to fetch the response from the server 108. In one embodiment, client_recv may take two parameters: a first parameter identifying a server from which to fetch a response (e.g., an identifier for the server 108) and a second parameter identifying the location for the fetched response to be stored (e.g., a pointer to a memory location in the client's memory). client_recv may be implemented by a RDMA read operation for the client to remotely fetch a message from server's memory into client's local buffer, which may be provided by an existing or yet to be developed RNIC.

Embodiments may provide two APIs to be used by a server (e.g., server 108) to receive data sent by a client to be processed (e.g., client 102) and write a response to a local buffer for the client to fetch. One API, for example, server_send, may be used by the server 108 to write a response to a local buffer for the client 102 to fetch. In one embodiment, server_send may take three parameters: a first parameter identifying a client from which data to be processed is received and hence a response need to be sent to (e.g., an identifier for the client 102), a second parameter identifying the location of the response to be stored (e.g., a pointer to a memory location in the server's memory) and a third parameter indicating the size of the response). The response generated by the server may also be transmitted in a message to the client. server_send may therefore just put a message for the client into a server local buffer and need not perform any network operation. Another API, for example, server_recv, may be used by the server 108 to receive the data to be processed from the client 102. In one embodiment, server_recv may take two parameters: a first parameter identifying a client from which data to be processed may be received (e.g., an identifier for the client 102) and a second parameter identifying the location of the data to be processed (e.g., a pointer to a memory location in the server's memory).

Embodiments may also provide two APIs for allocating memory for storage of request or response and freeing the memory allocated. For example, one API, malloc_buf may be used to allocate a buffer in the memory. In one embodiment, malloc_buf may take one parameter indicating the size of buffer needed and return the location of the allocated buffer. If it is called at the client, then client side buffer may be allocated from the client side memory; if it is called at the server, then server side buffer may be allocated from the server side memory. The client side buffer and server side buffer may be referred to as local buffers because they are local to their respective processors. Another API, e.g., free_buf, may be used to free the allocated buffer in the memory. In one embodiment, free_buf may take one parameter indicating the location of the buffer to be free.

TABLE I

SUMMARY OF APIs

| APIs | Description |
| --- | --- |
| client_send(server_id,local_buf,size) | client sends a message (kept in client's local buffer) to server's memory through a RDMA write |
| client_recv(server_id,local_buf) | client remotely fetches a message from server's memory into client's local buffer through a RDMA read |
| server_send(client_id,local_buf,size) | server puts a message for client into server local buffer |
| server_recv(client_id/local_buf) | server receives a message from server local buffer |
| malloc_buf(size) | allocate local buffers that are registered in the RNIC for message being transferred through RDMA |
| free_buf(local_buf) | free local buffer that is allocated with malloc buffer |

Figure 2:
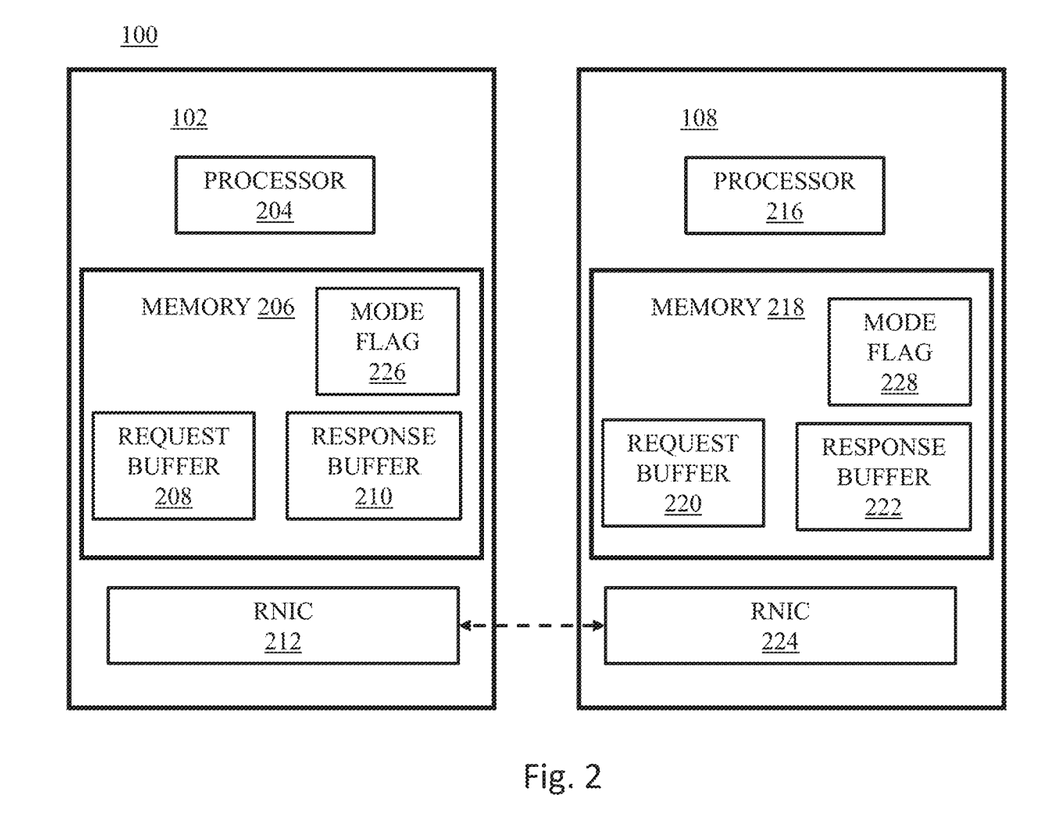
FIG. 2 schematically shows hardware components of a computing system in accordance with an embodiment of the present disclosure.

FIG. 2 schematically shows components of the computing system 100 according to an embodiment. The client 102 may comprise a processor 204, a memory 206 and a RNIC 212. The processor 204, memory 206 and RNIC 212 may be referred to as client processor 204 or client side processor 204, client memory 206 or client side memory 206, and client RNIC 212 or client side RNIC 212. The server 108 may comprise a processor 216, a memory 218 and a RNIC 224. The processor 216, memory 218 and RNIC 224 may be referred to as server processor 216 or server side processor 216, server memory 218 or server side memory 218, and server RNIC 224 or server side RNIC 224. Either or both the processor 204 and processor 216 may include one or more Central Processing Units (CPUs), one or more Graphics Processing Units (GPUs), or one or more CPUs and one or more GPUs. Either or both client memory 206 and server memory 218 may include random access memory (RAM), cache, or both. The RNIC 212 and RNIC 224 may be any existing RNICs or RNICs yet to be developed. The RNIC 212 may provide the RDMA write operation for the client 102 to write the data to be processed to the server side memory 218 and RDMA read operation for the client 102 to fetch the response from the server side memory 218. The RNIC 224 may support the RDMA write operation for the client 102 to write the data to be processed to the server side memory 218 and RDMA read operation for the client 102 to fetch the response from the server side memory 218.

In some embodiments, to perform a remote procedure call (RPC) implemented with remote fetching, the client 102 and server 108 may perform an initial process to establish communication, which may be referred to as establishing a pair of <client_id, RPC_id>(client_id for client identifier and RPC_id for RPC identifier). The initial process may be a hand shake process in one embodiment, or a registration process that the client 102 may register with the server 108 in another embodiment. During the initial process, the client 102 may generate or obtain an identifier for the server 108 and the server 108 may generate or obtain an identifier for the client 102. This initial process may be any existing or yet to be developed initialization process for establishing a client-server communication. The client processor 204 may then request memory buffers to be allocated for the RPC, for example, by executing the API malloc_buff with size information for a request buffer and a response buffer respectively. A request buffer 208 may be a representative client side local buffer for storing a request message (e.g., data to be processed by the server) and a response buffer 210 may be a representative client side local buffer for storing a response message (e.g., response generated by the server and fetched from the server side memory by the client). The request buffer 208 and response buffer 210 may be registered with the RNIC 212, and referred to as client request buffer 208 and client response buffer 210.

The server processor 216 may also request memory buffers to be allocated for the RPC, for example, by executing the API malloc_buff with size information for a request buffer and a response buffer respectively. A request buffer 220 may be a representative server side local buffer for storing a request message (e.g., data to be processed) received from the client and a response buffer 222 may be a representative server side local buffer for storing a response message (e.g., response generated by the server and to be fetched from the server side memory by the client). The request buffer 220 and response buffer 222 may be registered with the RNIC 224, and referred to as server request buffer 220 and server response buffer 222.

In one embodiment, the location information for the client request buffer 208, client response buffer 210, server request buffer 220 and server response buffer 222 may be recorded by both the server 108 and the client 102 when the client 102 registers itself to the server 108. Thus, both the client 102 and the server 108 may directly read from and write to the client request buffer 208, client response buffer 210, server request buffer 220 and server response buffer 222 without the need of further synchronizations.

In some embodiments, a remote procedure call (RPC) implemented with remote fetching may operate in two different RPC modes: repeated remote fetching, in which the client (e.g., the client 102) repeatedly trying to fetch responses without the server processor's involvement (e.g., no action by the server processor 216); and server reply, in which the server processor execute code to send the response back to the client (e.g., the server processor 216 spends computing time to perform this operation). In one embodiment, both the client 102 and the server 108 may maintain a mode flag for the pair which the client (e.g., the client 102) repeatedly trying to fetch responses without the server processor's involvement (e.g., no action by the server processor 216); and server reply, in which the server processor execute code to send the response back to the client (e.g., the server processor 216 spends computing time to perform this operation). In one embodiment, both the client 102 and the server 108 may maintain a mode flag for the pair of <client_id, RPC id>. As shown in FIG. 2, the client side memory 206 may comprise a mode flag 226 and the server side memory 228 may comprise a mode flag 228. The mode flags 226 and 228 may designate a current RPC paradigm in usage. The mode flags 226 and 228 may be modified only by the client 102, for example, by a local write to the local flag (e.g., mode flag 226) and an RDMA write to update the server's flag (e.g., mode flag 228). Therefore, the server 108 may know the current paradigm by checking the mode flag 228.

Initially, the mode flags 226 and 228 may be set to a first value (e.g., repeated remote fetching) and hence the client 102 may continuously fetch responses (e.g., computing results generated by the server 108) from the server 108. If, however, it takes a long time for the server 108 to generate the response, the client 102 may encounter failures when trying to fetch a response. When the number of failed retries becomes larger than a threshold R, the client 102 may update the mode flags 226 and 228 to a second value (e.g., server reply) and switch itself to server reply, e.g., waiting until the response (e.g., server process result) is sent from the server 108. In some embodiments, the threshold R may be a configurable predefined number. In contrast, if the mode flags 226 and 228 are currently set to server reply, the client 102 may record the last response time (e.g., the amount of time the server processor 216 spent on preparing the response) it received from the server 108 and switch back to repeated remote fetching if it finds the response time becomes shorter. In one embodiment, for example, the client 102 may record the response time when it successfully performed a remote fetching and designate that response time as a previous remote fetching response time. In the server reply mode of operation, the client 102 may compare the last response time with the previous remote fetching response time to determine whether the response time becomes shorter. In another embodiment, the client 102 may be configured with a predefined threshold M, and record M response times for M successfully performed remote fetching operations. And in the server reply mode of operation, the client 102 may compare the last response time with an average of the M response times to determine whether the last response time becomes shorter.

In some embodiments, some requests with unexpectedly long server process time may cause an unnecessary switch between repeated remote fetching and server-reply. To avoid this phenomenon, in addition to the threshold R, another configurable predefined number N may be used to determine whether to perform the switch from remote fetching to server-reply. In one embodiment, the configurable predefined number N may define a number of continuous RPC calls. For example, the client 102 may switch to server reply only after N continuous RPC calls that each suffer R failed retries of remote fetching. Otherwise, the client 102 may remain in the repeated remote fetching mode. The configurable predefined number N may be selected based on some experimental test runs. For example, in an embodiment, the configurable predefined number N may be selected as two for one application because an evaluation of the experiment results may show that very few requests have unexpectedly long process time for that application. Thus, it is quite rare that two (or more) continuous RPC calls suffer from unexpectedly long process time for that application.

Figure 3A:
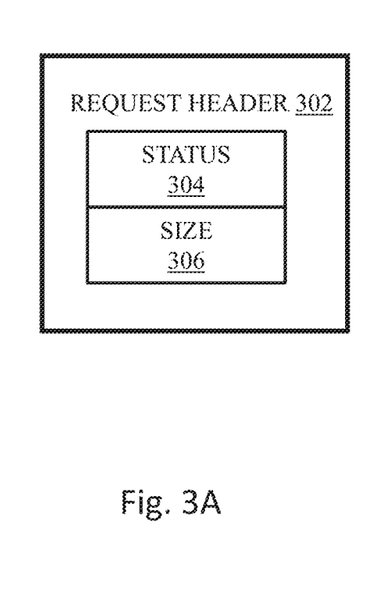
FIG. 3A schematically shows a request header in accordance with an embodiment of the present disclosure.

In some embodiments, a request in the request buffers 208 and 220 may comprise a request header and a response in the response buffers 210 and 222 may comprise a response header. FIG. 3A schematically illustrates an example request header 302. The request header 302 may comprise a status field 304 and a size field 306. The status field 304 may contain a value to denote a status of the request and the size field 306 may contain a value to denote the payload size of the request. For example, when a request buffer (e.g., the request buffer 208 or 220) is just allocated (e.g., by executing the API malloc_buff) and the request has not been stored in the request buffer, the request header including the value in the status field 304 has not been set. In one embodiment, the status field 304 may be one bit, for example, "0" may indicate that the request is not ready and "1" may indicate that the request is ready. After the client 102 prepares a request, it may call the API client_send to stores the request in the client request buffer 208. The value of the status field 304 may be set to indicate that the request is ready and the size field 306 may be set to the size of the payload size of the request, and the RNIC 212 may perform a RNIC-write operation to transmit the request from the request buffer 208 to the request buffer 220 of the server 108. The server processor 216 may execute a server computing thread that consistently monitors the server request buffer 220. When the server computing thread detects that the value of the status field 304 is set to indicate that the request is ready, the server processor 216 may execute the API server_recv to retrieve the request payload from the request buffer 220. In one embodiment, the buffer size requested in the malloc_buff may be a configurable value and chosen to be large enough such that one buffer size may accommodate most requests (including the request header and the payload). In one embodiment, the size field 306 may be 31 bits. The status field 304 and the size field 306 may have other field widths in other embodiments.

Figure 3B:
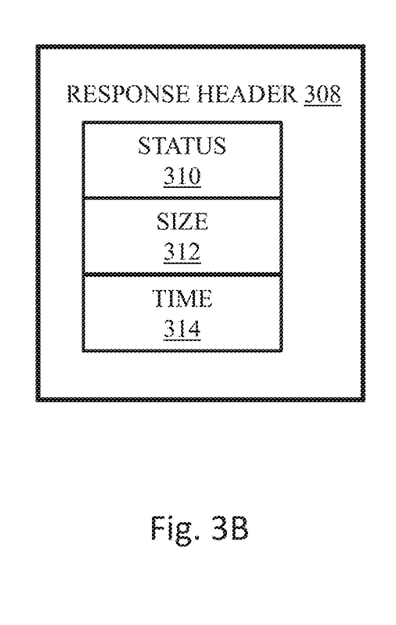
FIG. 3B schematically shows a response header in accordance with an embodiment of the present disclosure.

FIG. 3B schematically illustrates an example response header 308. The response header 308 may comprise a status field 310, a size field 312 and a time field 314. The status field 310 may contain a value to denote a status of the response, the size field 312 may contain a value to indicate the size of the response payload and the time field 314 may contain a value to indicate the response time. For example, when a response buffer (e.g., the response buffer 210 or 222) is just allocated (e.g., by executing the API malloc_buff) and the response has not been stored in the response buffer, the status field 310 may not be set to indicate that the response is ready. In one embodiment, the status field 310 may be one bit, for example, "0" may indicate that the response is not ready and "1" may indicate that the response is ready. Once the processor 216 of the server 108 processes the request, it may generate a response and write the response in the server response buffer 222. When writing the response to the server response buffer 222, the processor 216 of the server 108 may also set the value of the status field 310 to indicate the response is ready, and may also enter a size value for the response payload to the size field 312 and a response time to the time field 314.

If the current RPC mode is repeated remote fetching, the client 102 may execute a computing thread for repeatedly executing the API client_recv (e.g., asking the RNIC 212 to continuously repeat a RNIC-read operation) to try to fetch the content of the response buffer 222 of the server 108 and store the fetched result in the response buffer 210 of the client 102. In one embodiment, the RNIC-read operation may be configured with a size F. When the status field 310 contains a value to indicate that the response is ready, the client 102 may determine that the response has been obtained. In addition, the client 102 may also need to determine whether the RNIC-read operation obtains the whole response by comparing the size F to the total size of the response (e.g., the size of the response header+size value in the size field 312). If the size F is larger than or equal to the total size of the response, the obtained response is the whole response. If the size F is less than the total size of the response, the obtained response is only a part of the whole response, and another RNIC-read operation may be needed to fetch remaining part of the response.

If the current RPC mode is server reply, the server processor 216 may execute code to send the response back to the client. In one embodiment, the server RNIC 224 may perform a RNIC-write operation to write the response to the response buffer 210 of the client 102 in server reply mode. Because the server processor 216 may spend clock cycles to actively send the response to the client 102, the server reply mode of operation may be much costly to server performance in comparison to the repeated remote fetching mode.

The response time stored in the time field of the response header 308 may be used by the client 102 for switching RPC mode (e.g., whether to switch from server reply to remote fetching).

In one embodiment, the status field 310 may be one bit, the size field 312 may be 31 bits and the time field may be 16 bits. One or more of these field widths may be different in another embodiment.

Figure 4:
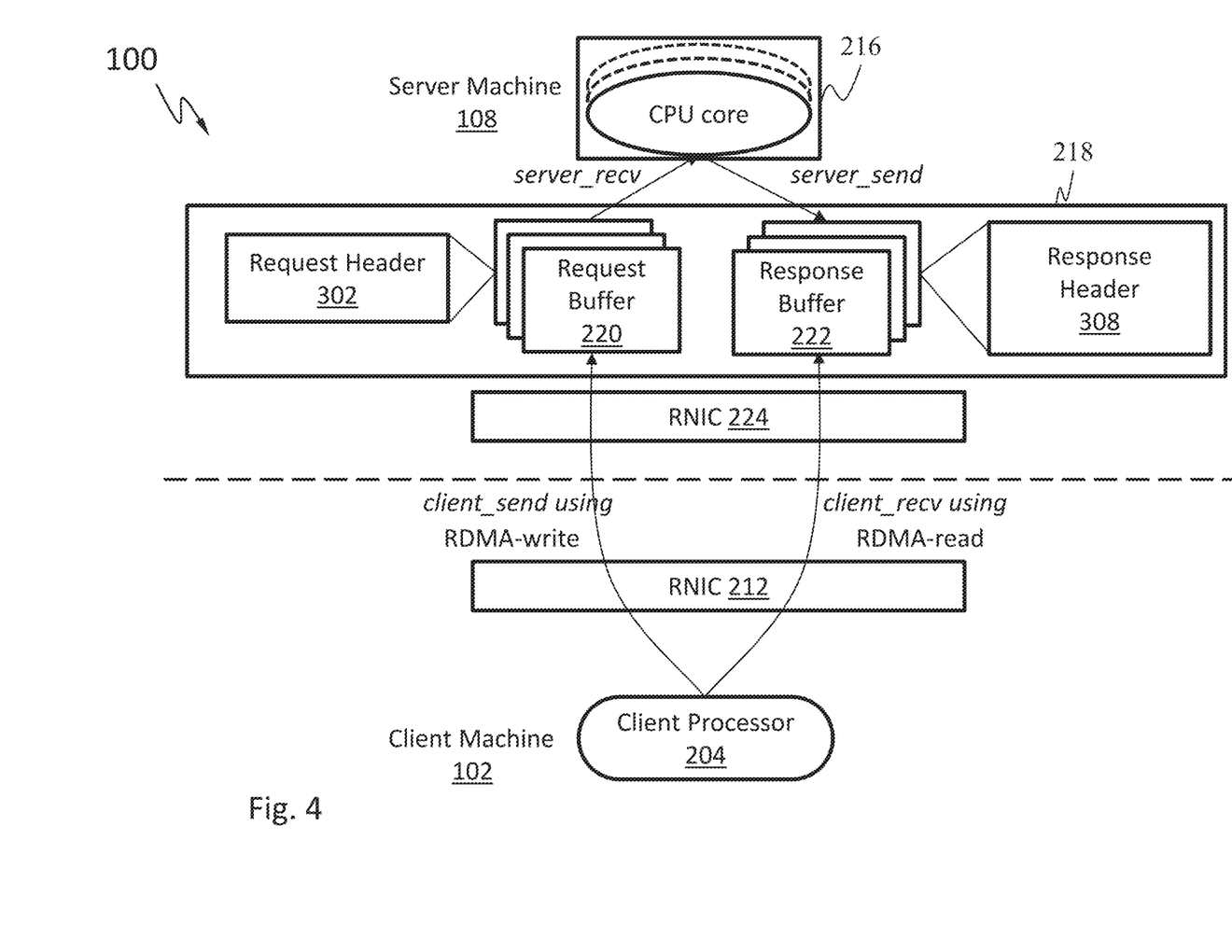
FIG. 4 schematically shows communication in a computing system in accordance with an embodiment of the present disclosure.

FIG. 4 schematically shows communication in the computing system 100 in accordance with an embodiment of the present disclosure. The client processor 204 of the client machine 102 may use an API call client_send to write a request to one of the server request buffers 220 in the server side memory 218. The client_send call may cause the RNIC 212 to use a RDMA write operation to perform the write. Although the client side memory 206 is not shown in FIG. 4 to simplify the illustration, the client_send API call may first write the request (including the request header and payload data) to a client request buffer 208 of the client side memory 206, and then cause the RNIC 212 to use a RDMA write operation to write the request to the server side memory 218. When the request is written to one of the request buffers 220, the corresponding request header 302 may be set such that its status field may indicate that a request has been received, and its size field may indicate the size of the payload data. The processor 216 of the server machine 108 may use an API call server_recv to retrieve the request from the memory 218 and perform the server side processing of the payload data. In one embodiment, as shown in FIG. 4, the processor 216 may be a multi-core CPU.

After the response is generated, if the RPC mode is repeated remote fetching, the processor 216 may use an API call server_send to write the response (e.g., including the response header 308 and payload data of the response) to one of the response buffers 222. In the repeated remote fetching mode, the client processor 204 may make an API call of client_recv, which may cause the RNIC 212 of the client machine 102 repeatedly trying a RDMA read operation, until the response is fetched, or the threshold R is reached. Although the client side memory 206 is not shown in FIG. 4 to simplify the illustration, successfully fetched response may be stored in a client response buffer 210 of the client side memory 206 by the RNIC 212 and retrieved by the client processor 204 to perform the client side processing.

Throughput for the remote fetching operation may be determined by a number of factors, including the threshold R (e.g., the retrying number of RDMA read before a client may switch to the server-reply mode), the fetching size F used by a client RNIC to read remote response from a server, the process time P for amount of time spent by a server processor to process a request, and a RPC call result size S (e.g., the response size that includes the response header and the response payload data size). Thus, the throughput T may be determined by the equation:

$$T = \underset{R,F}{\mathrm{argmax}}\, f(R, F, P, S).$$

Among these factors, the process time P and the RPC call result size S may be related to applications (e.g., web page service, database operations, in-memory key-value data stores), and the threshold R and the fetching size F may be related to both RNIC hardware characteristics and applications.

Figure 5:
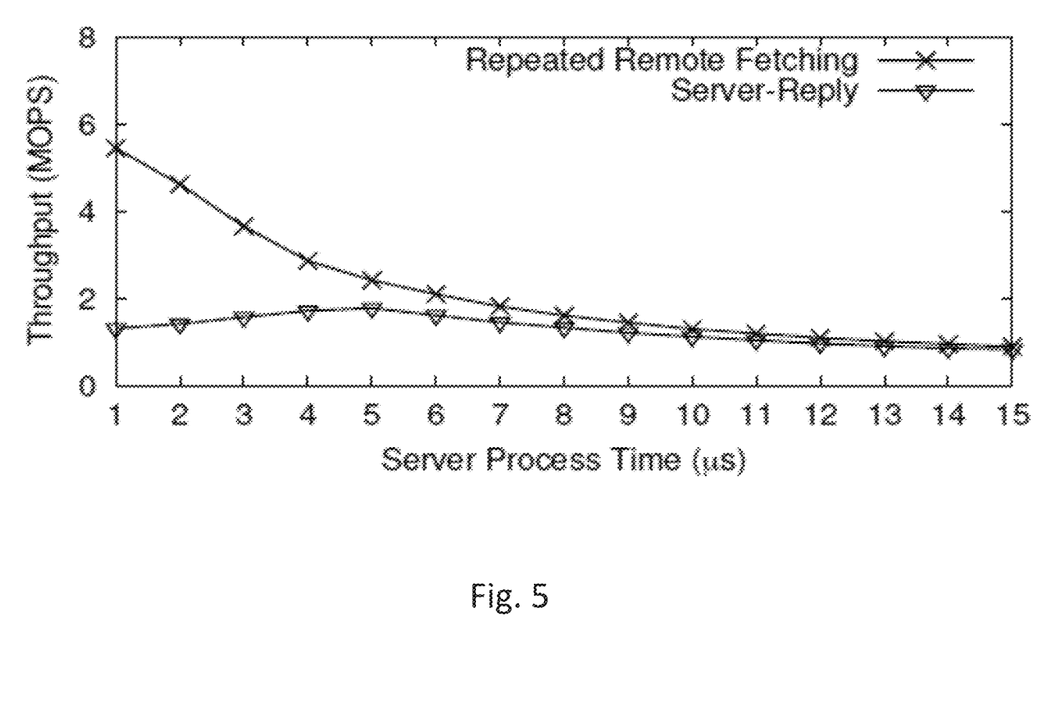
FIG. 5 shows throughput of repeated remote fetching and server-reply in accordance with an embodiment of the present disclosure.

FIG. 5 schematically shows the throughput of repeated remote fetching and server-reply in accordance with an embodiment of the present disclosure. In the example shown in FIG. 5, both fetching size F and RPC call result size S may be set to 1 byte, so that only one RDMA Read operation may be needed for fetching the result even when the server process time of the requests varies. The throughput (e.g., million operations per second (MOPS)) may therefore be the upper-bound of T for every P, no matter how F and S change. This is because: (i). making F and S not equal to each other leads to either additional RDMA operations required (when F is less than S), or no benefit at all but only bandwidth waste (when F is larger than S); (ii). when F (and S) increases, throughput will only drop. Given this upper-bound curve over P for all possible F and S, we can have an upper bound of R, i.e., R should be within [1,N], where N is the upper-bound number of RDMA read retries. If R>N, the throughput improvement of repeated remote fetching is limited while it consumes more clients' processor resources (e.g., CPU resources) than server-reply. The selection of N may depend on the hardware configurations as well as software developers' inputs about their expectations on trade-off between throughput improvement and processor consumption of clients. In one embodiment, N may be chosen to be 5, which may be mapped to the point where P may be 7 µs in the example of FIG. 5. The throughput of repeated remote fetching may not be significantly larger than server-reply when P≥7 µs (within 10%), because at this point the client may spend more than twice the processor consumption than the server.

Figure 6:
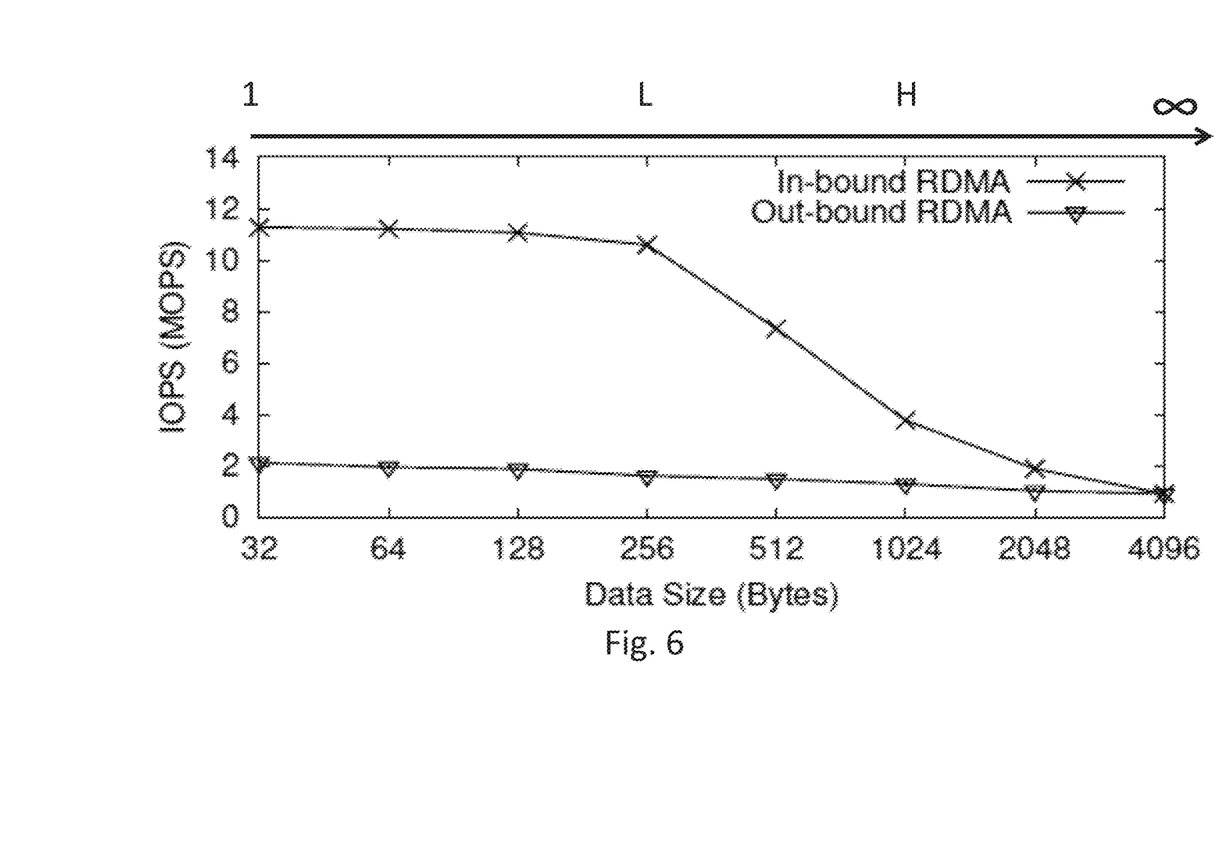
FIG. 6 shows Input/Output operation per second (IOPS) of out-bound RDMA and in-bound RDMA in accordance with an embodiment of the present disclosure.

FIG. 6 shows the IOPS of RNIC under different data size in accordance with an embodiment of the present disclosure. The curve in the figure, presenting the relationship between IOPS and data size, may be divided into three ranges: [1,L),

[L,H], and (H,∞). Data size smaller than L (in the first range) does not increase the throughput due to the startup overhead of data transmission in the RNIC. Data size larger than H also does not increase the throughput, as bandwidth may become bottleneck at this time and throughput may decrease linearly with the increasing size. Thus, F may be in the second range [L,H]. L and H may rely on hardware configuration, and may be obtained by running a pilot or benchmark test. For example, in one embodiment, L may be 256 bytes and H may be 1024 bytes.

Based on FIGS. 5 and 6 and corresponding description, the value of R may be limited to [1,N] and the value of F may be limited to [L,H]. That is, H minus L (H−L) times N pairs of candidates may need to be considered for selection of the values for R and F. Moreover, both N and H−L may be small enough for a simple enumeration. Therefore, in one embodiment, an enumeration-based method may be used to decide the R and F, in which the following equation may be used for comparison:

$$T = \sum_{i=1}^{M} T_i, \text{ where } T_i = \begin{cases} I_{R,F} & F \geq S_i \\ \dfrac{I_{R,F}}{2} & F < S_i \end{cases}$$

For each result of an application, a throughput ($T_i$) for repeated remote fetching may be calculated. The calculation of $T_i$ may depend on the fetching size (F), the result size ($S_i$), and the IOPS of the RNIC under R and F ($I_{R,F}$): if F≥Si, $T_i$ may be $I_{R,F}$; if F<$S_i$, $T_i$ may be half of $I_{R,F}$ as two RDMA operations may be needed to fetch the whole result. $I_{R,F}$ may be tested by running a benchmark. In one embodiment, all possible candidates may be tested once, and F and R may be selected such that their values may maximize the throughput (T) for all M results as the optimum parameters for the application. The M results of the application may be collected by pre-running it for a certain time or sampling periodically during its run. The selection complexity may be O((H−L)NM).

Figure 7:
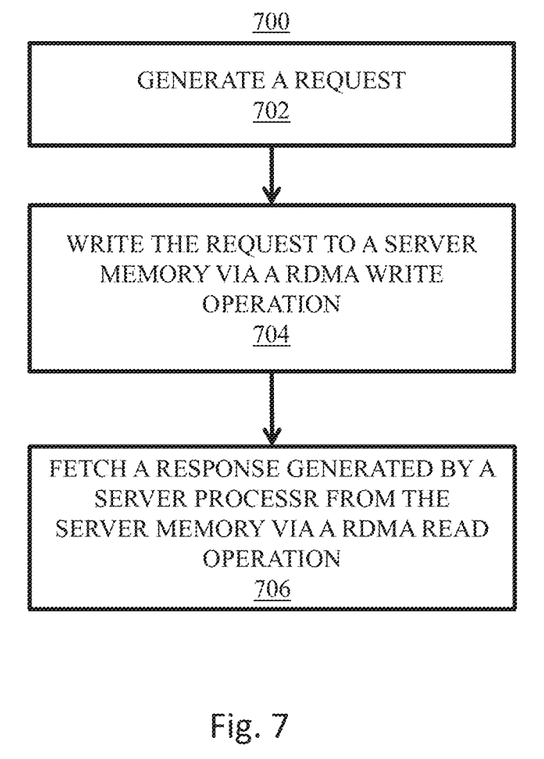
FIG. 7 is a flow diagram for performing a remote fetching in a client device in accordance with an embodiment of the present disclosure.

FIG. 7 shows a flow chart for a process 700 to perform a remote procedure call according to an embodiment. In block 702, a request may be generated. In one embodiment, generating the request may include setting a status field in a request header. The status field may indicate to a server processor that the request is ready. In block 704, the request may be written to a server memory via a Remote Direct Memory Access (RDMA) write operation. In block 706, a response generated by the server processor may be fetched from the server memory via a RDMA read operation.

Figure 8:
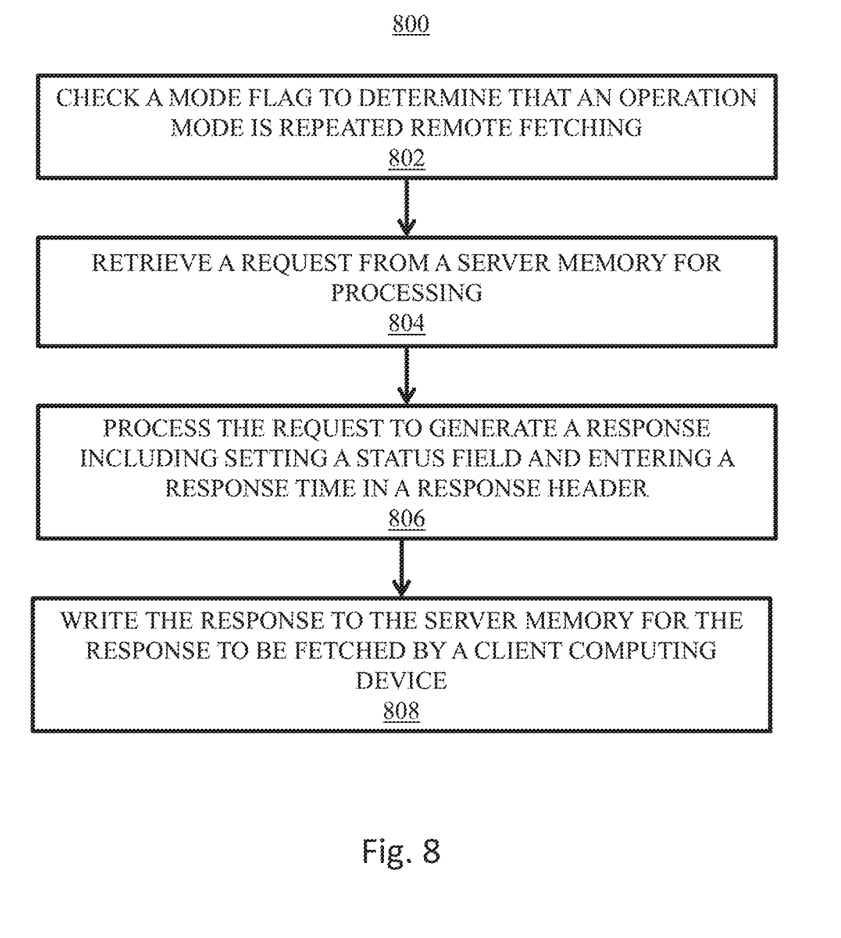
FIG. 8 is a flow diagram for performing a remote fetching in a server device in accordance with an embodiment of the present disclosure.

FIG. 8 shows a flow chart for a process 800 to perform a remote procedure call according to an embodiment. In block 802, a mode flag may be checked to determine that an operation mode is set to a first value. In one embodiment, the first value may denote that the client will perform repeated remote fetching. In block 804, a request may be retrieved from a server memory for processing. In block 806, the request may be processed to generate a response. In one embodiment, generating the response may include setting a status field and entering a response time in a response header. In block 808, the response may be written to the server memory for the response to be fetched by a client device. In one embodiment, the status field may indicate to the client device that the response is ready and the response time may indicate to the client device an amount of time spent by a processor to process the request.

Figure 9:
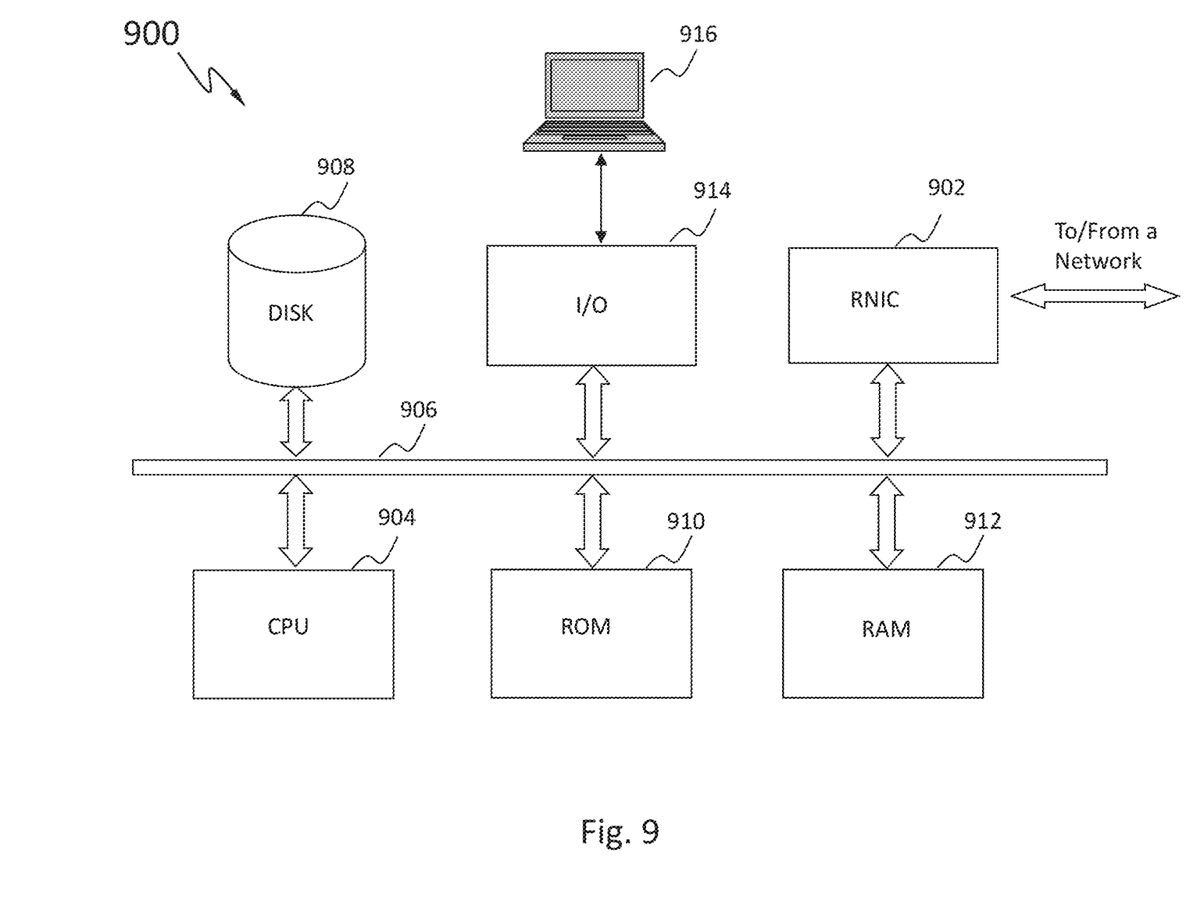
FIG. 9 depicts a general computer architecture in accordance with an embodiment of the present disclosure on which the present teaching can be implemented.

FIG. 9 is a functional block diagram illustration for a computing device 900 on which the present teaching may be implemented. The computing device may be a general-purpose computer or a special purpose computer, including but not limited to, a personal computer, a laptop, a server computer, a tablet, a smartphone. The methods and operations as described herein, e.g., in FIGS. 7-8, may each be implemented on one or more computers such as the computing device 900, via hardware, software program, firmware, or a combination thereof. In an embodiment, the computing device 900 may be used as a client device or a server device as described herein. Although only one such computer is shown, for convenience, a distributed computing system may include a plurality of clients and one or more servers implemented on a number of similar platforms to distribute the processing load from the plurality of clients.

The computing device 900, for example, may include one or more RNICs 902 connected to and from a network connected thereto to facilitate data communications. The computing device 900 may also include a CPU 904, in the form of one or more processors (e.g., single core or multi-core), for executing program instructions. The exemplary computer platform may further include an internal communication bus 906, program storage and data storage of different forms, e.g., disk 908, read only memory (ROM) 910, or random access memory (RAM) 912, for various data files to be processed and/or communicated by the computer, as well as possibly program instructions to be executed by the CPU 904. The computing device 900 may also include an I/O component 914, supporting input/output flows between the computer and other components therein such as user interface elements 916. The computing device 900 may also receive programming and data via network communications.

Hence, aspects of the method for presenting personalized content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. For example, although the implementation of various components described above may be embodied in a hardware device, it can also be implemented as a firmware, firmware/software combination, firmware/hardware combination, or a hardware/firmware/software combination. The presently disclosed embodiments are therefore to be considered in all respects as illustrative and not restrictive, the scope of the present teaching being indicated by the following claims and their legal equivalents, and not limited to the foregoing description.

What is claimed is:

1. A method, comprising:
   at a client device by a client processor:
   generating a request including setting a first status field in a request header, the first status field indicating to a server processor that the request is ready;
   writing the request to a server memory via a Remote Direct Memory Access (RDMA) write operation; and
   fetching a response generated by the server processor from the server memory via a RDMA read operation;
   at a server device by the server processor:
   retrieving the request from the server memory for processing;
   processing the request to generate the response, generating the response including setting a second status field and entering a response time in a response header;
   checking a mode flag to determine that an operation mode is set to a first value; and writing the response to the server memory for the response to be fetched by the client device, the second status field indicating to the client device that the response is ready and the response time indicating to the client device an amount of time spent by the server processor to process the request.

2. The method of claim 1, further comprising:
at the client device by the client processor:
setting the mode flag to the first value;
writing the mode flag to the server memory via a RDMA write operation; and
repeating the fetching up to a predefined number R of failures.

3. The method of claim 2, further comprising:
at the client device by the client processor:
changing the mode flag to a second value in response to reaching the predefined number R of failures of repeated fetching;
writing the mode flag set to the second value to the server memory via a RDMA write operation; and
waiting for the server processor to send the response.

4. The method of claim 3, further comprising:
at the server device by the server processor:
checking the mode flag to determine that the operation mode is set to the second value; and
sending the response to the client device via a Remote Direct Memory Access (RDMA) write operation.

5. The method of claim 3, further comprising:
at the client device by the client processor:
comparing a first response time contained in the response sent back by the server device with a second response time received in a previously fetched response;
determining that the first response time is shorter than the second response time;
changing the mode flag to the first value in response to a determination that the first response time is shorter than the second response time; and
writing the mode flag to the server memory via a RDMA write operation.

6. The method of claim 2, further comprising, by the client processor and server processor, performing a benchmark test to select the predefined number R and a fetching size F.

7. The method of claim 6, further comprising, by the client processor and server processor, performing an experimental test run for an application to select a configurable predefined number N, wherein the configurable predefined number N defines a number of continuous RPC calls and the mode flag is changed to a second value only after N continuous RPC calls that each suffer R failed retries of fetching.

8. A computing system, comprising:
a client device comprising:
a client Remote Direct Memory Access (RDMA) enabled network interface card (RNIC); and
a client processor configured to:
generate a request including setting a first status field in a request header, the first status field indicating to a server processor that the request is ready;
write the request to a server memory via a RDMA write operation by the client RN IC; and
fetch a response generated by the server processor from the server memory via a RDMA read operation by the client RNIC; and
a server device comprising:
a server Remote Direct Memory Access (RDMA) enabled network interface card (RNIC); and
a server processor configured to:

check a mode flag to determine that an operation mode is set to a first value;
retrieve the request from the server memory for processing, the request being received in the server memory via the server RNIC;
processing the request to generate the response, generating the response including setting a second status field and entering a response time in a response header; and
writing the response to the server memory for the response to be fetched by a client device via the server RNIC, the second status field indicating to the client device that the response is ready and the response time indicating to the client device an amount of time spent by the server processor to process the request.

9. The computing system of claim 8, wherein the client processor is further configured to:
set the mode flag to the first value;
write the mode flag to the server memory via a RDMA write operation by the client RNIC; and
repeat the fetching up to a predefined number R of failures.

10. The computing system of claim 9, wherein the client processor is further configured to:
change the mode flag to a second value in response to reaching the predefined number R of failures of repeated fetching;
write the mode flag set to the second value to the server memory via a RDMA write operation by the client RNIC; and
wait for the server processor to send the response.

11. The computing system of claim 10, wherein the server processor is further configured to:
check the mode flag to determine that the operation mode is set to the second value; and
send the response to the client device via a RDMA write operation by the server RNIC.

12. The computing system of claim 10, wherein the client processor is further configured to:
compare a first response time contained in the response sent back by the server device with a second response time received in a previously fetched response;
determine that the first response time is shorter than the second response time;
change the mode flag to the first value in response to a determination that the first response time is shorter than the second response time; and
write the mode flag to the server memory via a RDMA write operation by the client RNIC.

13. The computing system of claim 9, wherein the client processor and server processor are further configured to perform a benchmark test to select the predefined number R and a fetching size F.

14. The computing system of claim 13, wherein the client processor and server processor are further configured to perform an experimental test run for an application to select a configurable predefined number N, wherein the configurable predefined number N defines a number of continuous RPC calls and the mode flag is changed to a second value only after N continuous RPC calls that each suffer R failed retries of fetching.

15. One or more computer-readable non-transitory media comprising one or more instructions that when executed by one or more processors is to configure the one or more processors to cause the performance of operations comprising:

at a client device by a client processor:
  generating a request including setting a first status field in a request header, the first status field indicating to a server processor that the request is ready;
  writing the request to a server memory via a Remote Direct Memory Access (RDMA) write operation; and
  fetching a response generated by the server processor from the server memory via a RDMA read operation;
at a server device by the server processor:
  retrieving the request from the server memory for processing;
  processing the request to generate the response, generating the response including setting a second status field and entering a response time in a response header;
  checking a mode flag to determine that an operation mode is set to a first value; and
  writing the response to the server memory for the response to be fetched by the client device, the second status field indicating to the client device that the response is ready and the response time indicating to the client device an amount of time spent by the server processor to process the request.

16. The computer-readable non-transitory media of claim 15, the operations further comprising:
at the client device by the client processor:
  setting the mode flag to the first value;
  writing the mode flag to the server memory via a RDMA write operation; and
  repeating the fetching up to a predefined number R of failures.

17. The computer-readable non-transitory media of claim 16, the operations further comprising:
at the client device by the client processor:
  changing the mode flag to a second value in response to reaching the predefined number R of failures of repeated fetching;
  writing the mode flag set to the second value to the server memory via a RDMA write operation; and
  waiting for the server processor to send the response.

18. The computer-readable non-transitory media of claim 17, the operations further comprising:
at the server device by the client processor:
  checking the mode flag to determine that the operation mode is set to the second value; and
  sending the response to the client device via a Remote Direct Memory Access (RDMA) write operation.

19. The computer-readable non-transitory media of claim 17, the operations further comprising:
at the client device by the client processor:
  comparing a first response time contained in the response sent back by the server with a second response time received in a previous response;
  determining that the first response time is shorter than the second response time;
  changing the mode flag to the first value in response to a determination that the first response time is shorter than the second response time; and
  writing the mode flag to the server memory via a RDMA write operation.

20. The computer-readable non-transitory media of claim 16, the operations further comprising, by the client processor and server processor, performing a benchmark test to select the predefined number R and a fetching size F.

21. The computer-readable non-transitory media of claim 20, the operations further comprising, by the client processor and server processor, performing an experimental test run for an application to select a configurable predefined number N, wherein the configurable predefined number N defines a number of continuous RPC calls and the mode flag is changed to a second value only after N continuous RPC calls that each suffer R failed retries of fetching.

\* \* \* \* \*